J. N. GOODALL.
PIPE COUPLING.
APPLICATION FILED MAR. 11, 1910.
1,046,175.
Patented Dec. 3, 1912.
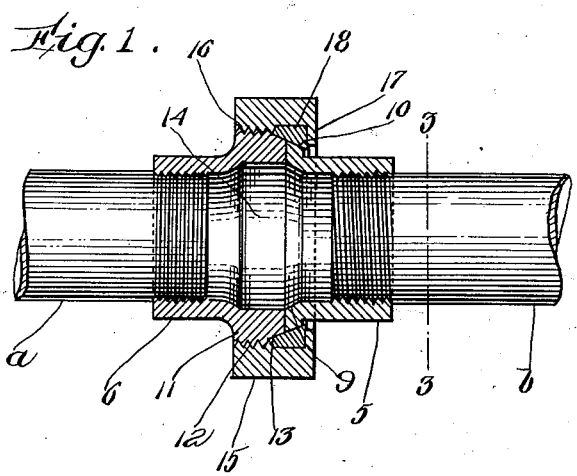
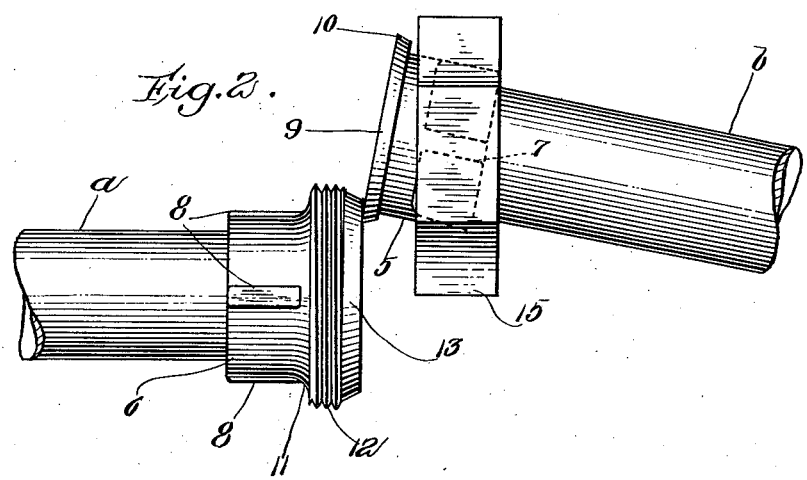
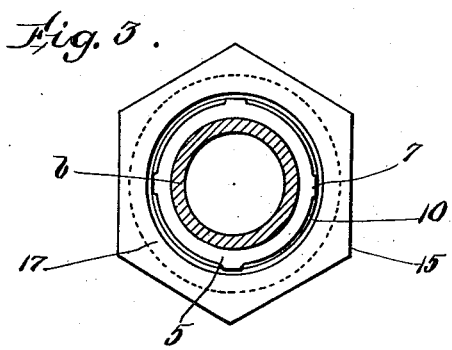
Witnesses:
Inventor:
John N. Goodall
By Henry J. Miller, atty.

UNITED STATES PATENT OFFICE.

JOHN N. GOODALL, OF PORTSMOUTH, NEW HAMPSHIRE.

PIPE-COUPLING.

1,046,175.

Specification of Letters Patent.   Patented Dec. 3, 1912.

Application filed March 11, 1910. Serial No. 548,604.

*To all whom it may concern:*

Be it known that I, JOHN N. GOODALL, of Portsmouth, in the county of Rockingham and State of New Hampshire, have invented certain new and useful Improvements in Pipe-Couplings, of which the following is a specification, reference being had to the accompanying drawings, forming part thereof.

This invention has reference to improvements in couplings or unions for pipes or conduits of various kinds.

One object of the invention is to provide a simple coupling of the nature described which may be inserted between the ends of two adjacent alined pipes or conduits, by slightly swinging one of said pipes or conduits out of line.

Another object of the invention is to so construct a coupling or union of the nature described that the joint between the coupling collars may be exteriorly packed, and that the bore of the coupling shall not be restricted.

Other objects of the invention will appear from the following description.
The invention consists in a pair of pipe thimbles combined with a compression coupling for said thimbles.

The invention also consists in such other novel features of construction and combination of parts as shall hereinafter be more fully described and pointed out in the claims.

Figure 1, represents a vertical sectional view of the improved coupling illustrating its use in connecting the ends of two alined pipes or conduits. Fig. 2, represents the parts of the coupling as disconnected and shows one of the pipes or conduits as swung out of alinement with the other of said pipes or conduits. Fig. 3, represents a sectional view taken on line 3—3 Fig. 1 showing an end view of the coupling.

Similar numbers of reference designate corresponding parts throughout.
Couplings of the nature herein described can be utilized to permanently couple or connect the adjacent ends of two pipes or conduits, but said couplings are particularly adapted for use in connecting the ends of pipes or conduits to which, from time to time, it may be necessary or desirable to have access for any reason or from which line of pipe it may be necessary to remove a length of pipe.
In carrying this invention into practice, I construct a pair of collars 5 and 6 interiorly screw threaded and having on their exterior ribs 7 and 8 or similar means adapted to be engaged by a suitable wrench or tool, to screw said collars into place on the ends of pipes. The collar 5 has the enlarged annular end 9 furnished with the exterior conical seat 10, while the collar 6 has the annular enlargement 11 having peripherally disposed screw threads 12 and the conical seat 13 which extends to the end of the enlargement 11, whereby said seats 10 and 13 conjointly form a truncated cone, of which the screw threads 12 of the enlargement 11 represent the base, and the walls of which embrace the chamber 14 preferably of larger diameter than the bore of the pipes to which said collars are adapted to be screwed. Provision for drawing together and securing said collars 5 and 6 is supplied by means of the nut 15 having the inner screw threads 16 and the inwardly extending flange 17 between which and the screw threads 16 is formed an annular compartment in which is located the packing 18 of any suitable nature for which the flange 17 forms a seat.

With the collars 5 and 6 secured to pipes or conduits *a*, *b*, of any desired kind and adapted for any use to which pipes or conduits may be placed, and with the nut 15 embracing the collar 5 or the pipe to which said collar is secured, (as shown in Fig. 2) the ends of the pipes *a* and *b* are brought into alinement and the nut 15 is screwed on to the screw threads 12 of collar 6 whereon by the face of packing 18 is brought to bear against the conical seat 10 and usually draws said collar 5 until the flat annular end of the enlargement 9 of said collar 5 bears against the similar end of the enlargement 11 of collar 6 and the packing 18 becomes compressed against the conical surfaces 10 and 13 and over the line of juncture between the meeting faces of said collars 5 and 6 or, when the pipes do not yield to such drawing strain, over the slight space between said faces. By this means the ends of said collars are not only brought into intimate contact but they are also embraced by a compression collar, the packing, whereby the joint is effectually sealed.

For some uses it is desirable that, in couplings of this general nature, the bores of the coupling members should equal or exceed in diameter the diameter of the bores of the pipes or conduits connected by said couplings, and in this particular construction the diameter of the chamber 14 may be considerably greater than that of the pipes *a* and *b* while the flare of the collars 5 and 6 toward their meeting faces facilitates the insertion therein of fish wires when the couplings are used to connect lengths of electric conduits.

It is obvious that the packing 18 may be formed in part with or secured to the nut 15 and, in the latter case, it may be of metal, leather, rubber, or any other material suitable for the purpose for which it is used. The nut 15 forms a means which, in co-operation with the screw thread 12 of the collar 6, forms a drawing member for drawing the packing 17 against the conjoint conical seat formed by the surfaces 10 and 13 of said collars, and it is evident that any other means may be employed to draw said collar into said position. It also is evident that the collars 5 and 6 may be secured to the pipes *a* and *b* in any desired manner.

Having thus described my invention, I claim as new and desire to secure by Letters Patent—

1. A coupling of the nature described comprising a pair of collars having abutting conical ends forming conjointly a conical seat, one of said collars having an external screw threaded enlargement, a packing bridging the line of juncture between said collars, and a nut having an internal thread adapted to engage the screw thread of said threaded collar, said nut having means for drawing and compressing said packing to close said line of juncture when said nut is screwed into place, substantially as described.

2. A coupling of the nature described comprising two collars having flat meeting faces, one of said collars having a conical seat of which the base forms the end of the collar, the other of said collars having an exterior screw thread and a conical seat tapering, approximately, from said thread to the end of said collar, and a nut adapted to embrace said collars and having an internal screw thread adapted to engage the exterior thread of said second collar, and an inwardly extending flange and a packing located between said flange and said screw thread and having a flaring inner surface, substantially as described.

JOHN N. GOODALL.

Witnesses:
H. J. MILLER,
F. E. FITZGERALD.